(12) United States Patent
Esaki et al.

(10) Patent No.: US 7,621,196 B2
(45) Date of Patent: Nov. 24, 2009

(54) SHIFT LEVER DEVICE

(75) Inventors: Shiro Esaki, Aichi-ken (JP); Junya Nishio, Aichi-ken (JP); Yutaka Suzuki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 242 days.

(21) Appl. No.: 11/527,739

(22) Filed: Sep. 27, 2006

(65) Prior Publication Data
US 2007/0137366 A1    Jun. 21, 2007

(30) Foreign Application Priority Data
Sep. 28, 2005    (JP)    ............... 2005-282298

(51) Int. Cl.
*F16H 59/04*    (2006.01)
(52) U.S. Cl. .............. 74/473.3; 74/527; 74/566
(58) Field of Classification Search ........... 74/473.1, 74/473.24, 473.26, 473.3, 491, 523, 473.21, 74/473.25, 527, 538, 566
See application file for complete search history.

(56) References Cited
U.S. PATENT DOCUMENTS 2,317,654 A * 4/1943 Wharam ................. 74/484 R
2,478,356 A * 8/1949 Auten ..................... 74/484 R
4,612,820 A * 9/1986 Behrens ................... 74/473.23
5,029,680 A * 7/1991 Kobayashi et al. ......... 192/220.5
5,309,783 A * 5/1994 Doolittle et al. .......... 74/473.21
5,372,051 A * 12/1994 Kanematsu et al. ....... 74/473.25
5,497,673 A * 3/1996 Kataumi et al. ............. 74/473.3
5,522,279 A * 6/1996 Kataumi .................... 74/473.3
5,575,175 A * 11/1996 Kataumi et al. ........... 74/473.28
5,655,413 A * 8/1997 Barton ......................... 74/493
5,842,379 A * 12/1998 Kanamori .................. 74/473.28
6,029,535 A * 2/2000 Kenny et al. ................. 74/473.3
6,301,994 B1 * 10/2001 Syamoto ..................... 74/538

FOREIGN PATENT DOCUMENTS

JP    6-174060 A    6/1994

* cited by examiner

*Primary Examiner*—Richard W L Ridley
*Assistant Examiner*—Matthew A Johnson
(74) *Attorney, Agent, or Firm*—Roberts Mlotkowski Safran & Cole, P.C.; Thomas W. Cole (57) ABSTRACT

A shift lever device has resin pieces, and a resin outer tube which is formed at an outer side of a shift lever main body. The resin pieces and the resin outer tube can be molded separately. Therefore, the resin pieces independently can be molded with high precision. Even in a structure in which interposed portions of the resin pieces are interposed between a detent pin and inner walls of long holes of the shift lever main body, the interposed portions do not project-out unnecessarily at an inner side of the shift lever main body. Resin can be interposed between the detent pin and the long holes of the shift lever main body, without carrying out precise inspection or repair work.

7 Claims, 11 Drawing Sheets

SHIFT LEVER DEVICE

CROSS-REFERENCE TO RELATED APPLICATION

This application claims priority under 35 USC 119 from Japanese Patent Application No. 2005-282298, the disclosure of which is incorporated by reference herein.

BACKGROUND OF THE INVENTION

1. Field of the Invention

The present invention relates to a shift lever device of an automobile, and in particular, to a shift lever device for shifting an automatic transmission.

2. Description of the Related Art

Among shift lever devices for automobiles, there are those equipped with a shift lever main body formed in the shape of a tube, and a resin outer tube formed at the outer side of the shift lever main body (see, for example, Japanese Patent Application Laid-Open (JP-A) No. 6-174060). Long holes for insertion of a detent pin, which passes through in the direction orthogonal to the axis, are formed in the axial direction intermediate portion of the shift lever main body and the resin outer tube. The detent pin passes through a detent rod which is housed at the inner side of the shift lever main body. The detent rod is usually disposed at the top end sides of the long holes by being urged toward the top end side of the shift lever main body by the urging force of an urging member.

In such a shift lever device, due to a button, which is provided at the top end portion of the shift lever main body, being pushed and operated, the detent rod is moved toward the bottom end side of the shift lever main body against the urging force of the urging member, and the detent pin is moved toward the bottom end sides of the long holes. The operation of shifting to a specific shift position thereby becomes possible.

In a shift lever device as described above, because the shift lever main body and the detent pin are both formed of metal materials, when the detent pin moves within the long holes, the metals rub against one another and the operational feeling is poor.

Thus, at the time of molding the resin outer tube at the outer side of the shift lever main body, resin is made to flow to the inner sides of the long holes so as to interpose resin between the detent pin and the inner walls of the long holes. In this way, the metals are prevented from rubbing against one another, and the operational feeling is good.

However, in the case of the above-described structure, the resin which is made to flow to the inner sides of the long holes may project-out at the inner side of the shift lever main body as burrs and interfere with the detent rod. Therefore, precise inspection for checking whether there are or are not burrs and repair work for eliminating burrs are needed.

SUMMARY OF THE INVENTION

In view of the aforementioned, an object of the present invention is to provide a shift lever device which can interpose resin between a detent pin and a long hole of a shift lever main body, without carrying out precise inspection or repair work.

In order to overcome the above-described drawbacks, a shift lever device relating to an aspect of the present invention has: a shift lever main body which is formed in a shape of a tube, and in whose axial direction intermediate portion there is formed a long hole which passes through in a direction orthogonal to an axis; a detent pin inserted through the long hole; a first molding resin having an interposed portion which is interposed between the detent pin and an inner wall of the long hole at an inner side of the long hole of the shift lever main body; and a second molding resin formed at an outer side of the shift lever main body in order to fix the shift lever main body and the first molding resin.

The shift lever device of the above-described aspect is a structure in which the first molding resin and the second molding resin, which is formed at the outer side of the shift lever main body, are molded separately. Therefore, the first molding resin independently can be molded with high precision. Accordingly, the interposed portion of the first molding resin can be interposed between the detent pin and the long hole of the shift lever main body, without carrying out a precise inspection or repair work.

In the shift lever device of the above-described aspect, the interposed portion of the first molding resin may be withdrawn from an inner peripheral wall of the shift lever main body and disposed toward an outer periphery of the shift lever main body.

In the shift lever device of the above-described structure, even if slight burrs form at the interposed portion of the first molding resin, the burrs can be prevented from projecting-out at the inner side of the shift lever main body.

In the shift lever device of the above-described aspect, the first molding resin may be formed of a material which is softer than the second molding resin.

In the shift lever device of the above-described structure, the first molding resin, which slidingly-contacts the detent pin, is formed of a soft material. Therefore, the operational feeling can be made to be good. Further, because the second molding resin, which is formed at the outer side of the shift lever main body, is formed of a material which is harder than that of the first molding resin, the rigidity of the shift lever overall can be increased.

In the shift lever device of the above-described aspect, the first molding resin may have an extending portion which extends along a peripheral direction of the shift lever main body and is disposed between the second molding resin and an outer peripheral portion of the shift lever main body, and a groove may be formed between the interposed portion and the extending portion.

In the shift lever device of the above-described structure, the first molding resin can be prevented from falling-out from the shift lever main body by the extending portion which is disposed between the second molding resin and the outer peripheral portion of the shift lever main body. Further, the groove is formed between the extending portion and the interposed portion which is interposed between the detent pin and the inner wall of the long hole of the shift lever main body. Therefore, cracks can be prevented from forming between the interposed portion and the extending portion.

As described above, in the shift lever device of the present invention, resin can be interposed between the detent pin and the long hole of the shift lever main body, without carrying out a precise inspection or repair work.

DETAILED DESCRIPTION OF THE INVENTION

FIRST EMBODIMENT

Figure 1:
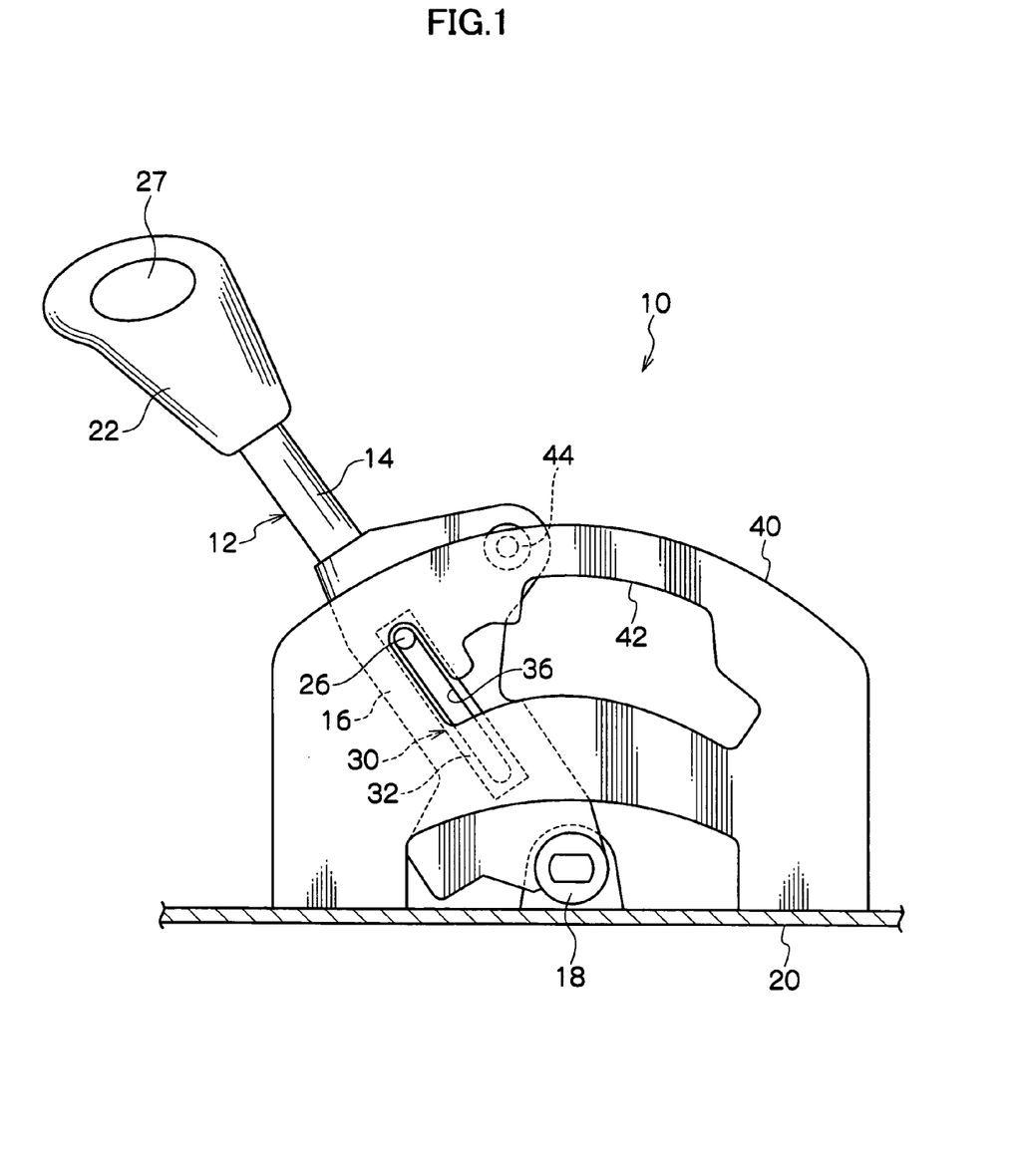
FIG. 1 is a side view showing the schematic structure of a shift lever device relating to a first embodiment of the present invention.
Figure 2:
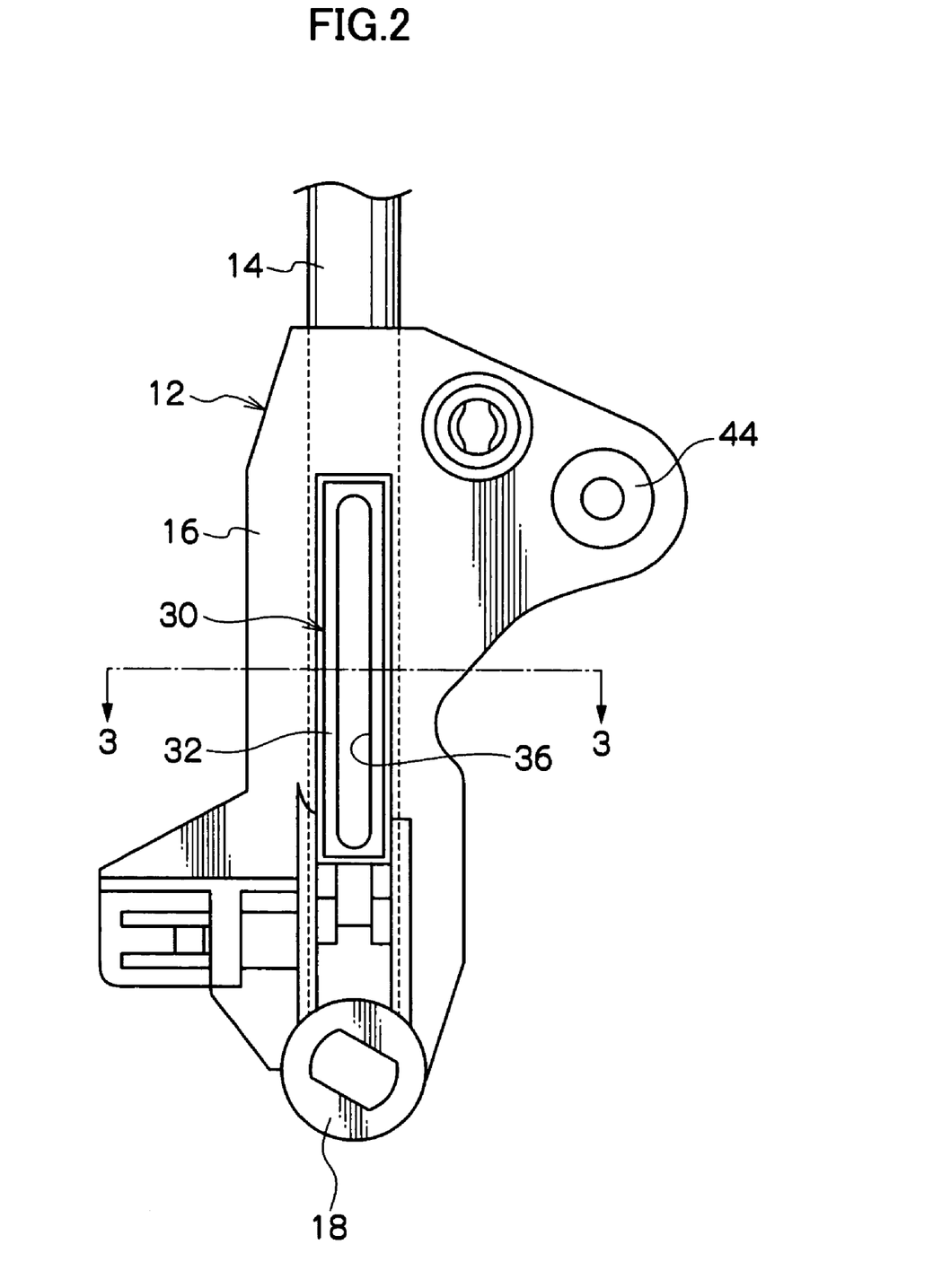
FIG. 2 is a side view showing the structure of a shift lever of the shift lever device relating to the first embodiment of the present invention.
Figure 3:
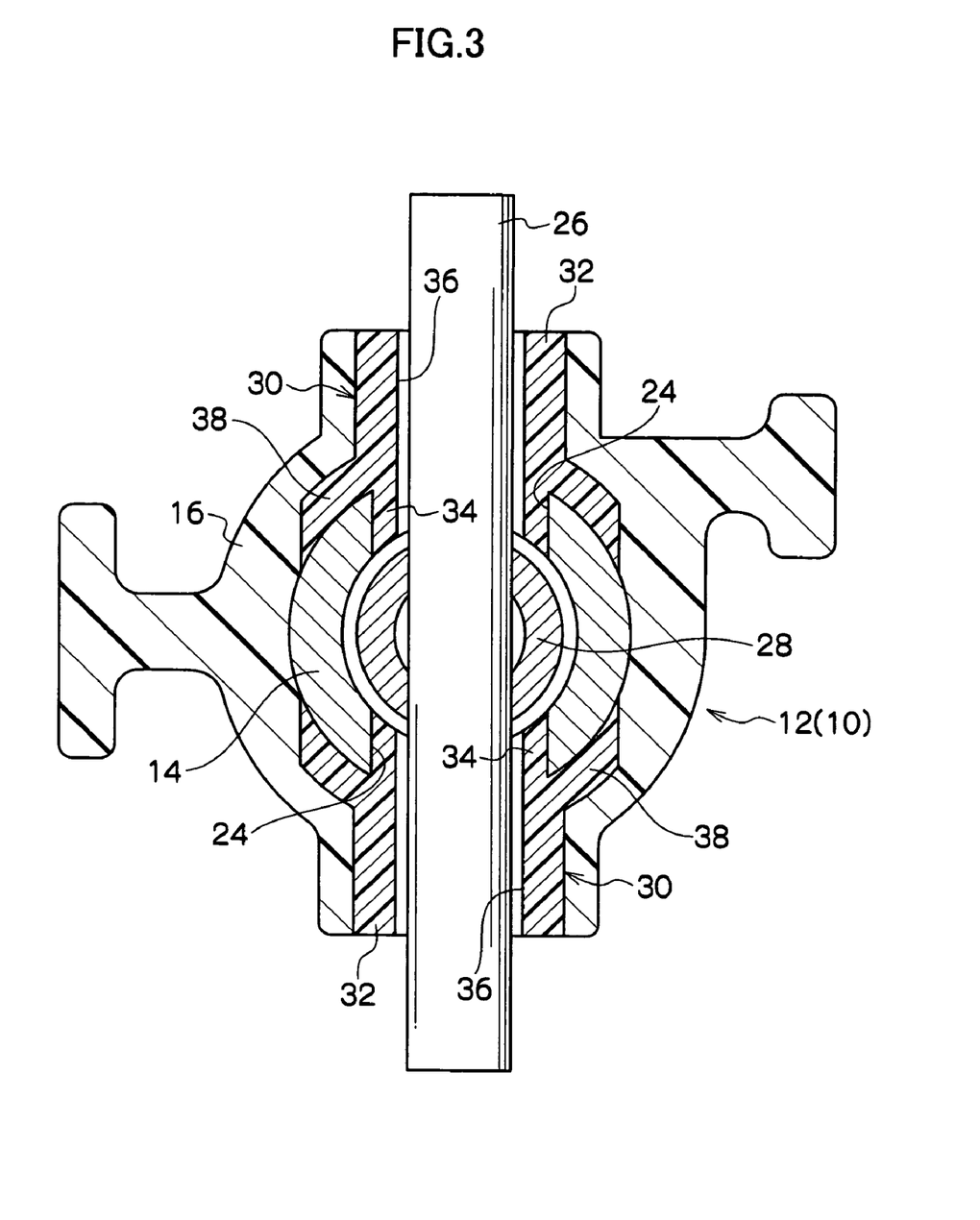
FIG. 3 is a cross-sectional view seen from line 3-3 of FIG. 2, and showing the structure of the shift lever of the shift lever device relating to the first embodiment of the present invention.

The structure of a shift lever device 10 relating to a first embodiment of the present invention is shown in a side view in FIG. 1. The partial structure of a shift lever 12, which is a structural member of the shift lever device 10, is shown in a side view in FIG. 2. The structure of the shift lever 12 is shown in FIG. 3 in a cross-sectional view seen from line 3-3 of FIG. 2.

The shift lever 12 of the shift lever device 10 has a shift lever main body 14 which is formed in the shape of a tube and of a metal material, and a resin outer tube 16 which serves as a second molding resin and is formed at the outer side of the shift lever main body 14 by insert molding of the shift lever main body 14. A tube-shaped retainer portion 18 is formed at the bottom end portion of the resin outer tube 16. The shift lever 12 is rotatably supported at a base plate 20 via this retainer portion 18.

Further, the shift lever 12 has a shift knob 22 which is mounted to the top end portion of the shift lever main body 14. By operating the shift knob 22, shifting operation in the longitudinal direction of the vehicle around the retainer portion 18 is possible.

Figure 4:
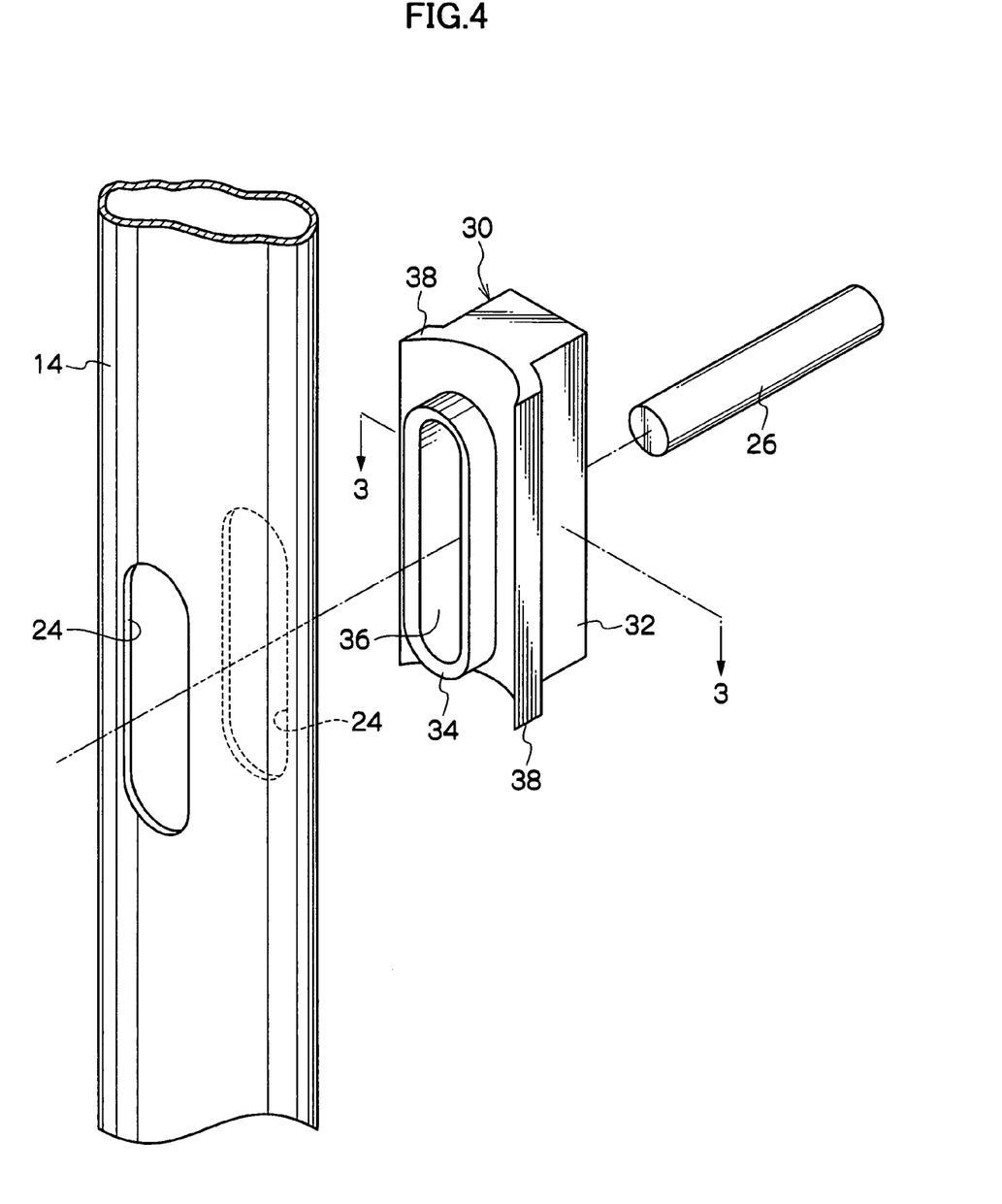
FIG. 4 is an exploded perspective view showing the structures of a shift lever main body, a first molding resin, and a detent pin which structure the shift lever of the shift lever device relating to the first embodiment of the present invention.
Figure 5:
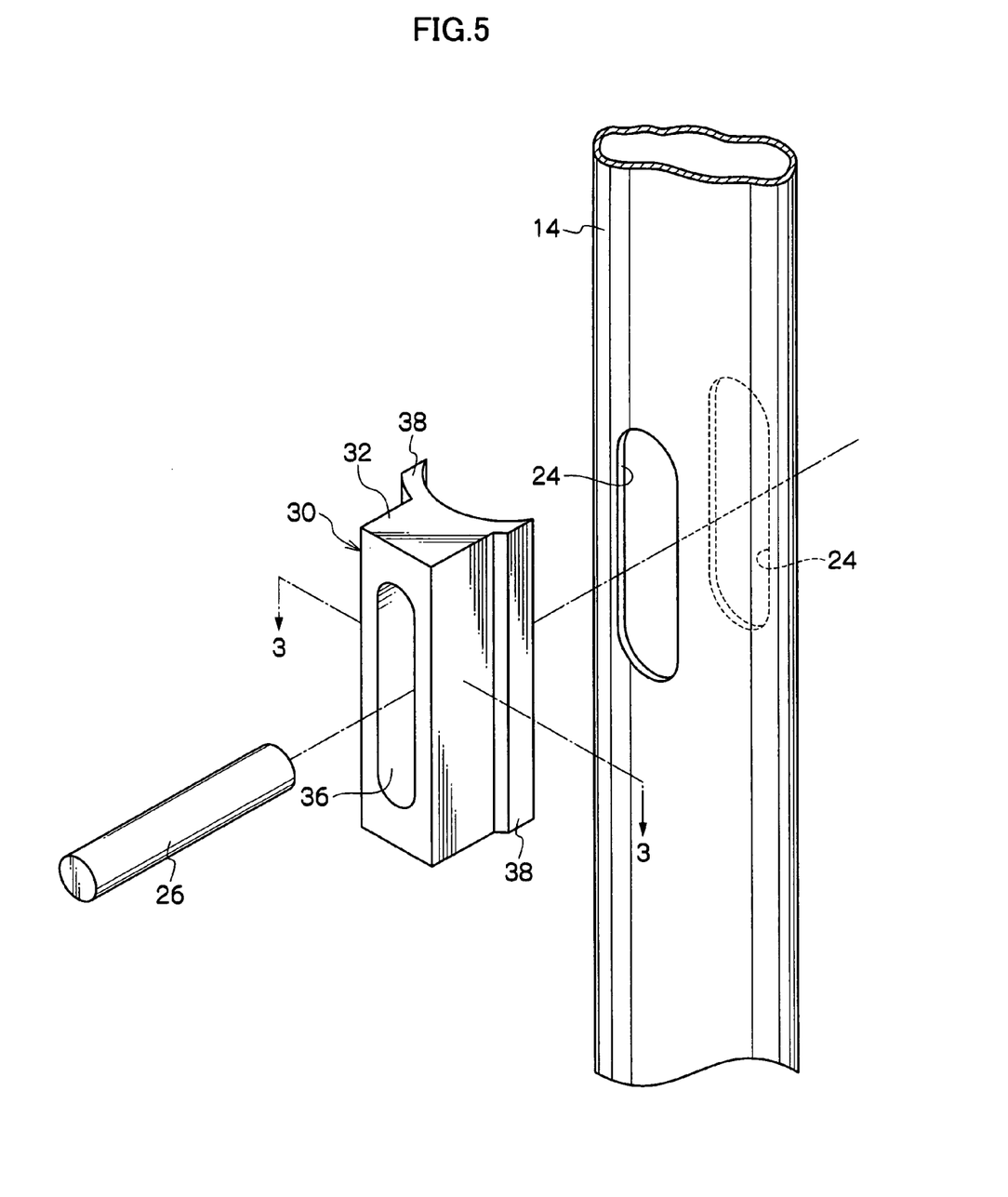
FIG. 5 is an exploded perspective view showing, in a state seen from a different angle than in FIG. 4, the structures of the shift lever main body, the first molding resin, and the detent pin which structure the shift lever of the shift lever device relating to the first embodiment of the present invention.

As shown in FIGS. 4 and 5, a pair of long holes 24, which pass through in the direction orthogonal to the axis, are formed so as to oppose one another in the axial direction intermediate portion of the shift lever main body 14. A detent pin 26, which is formed in the shape of a solid cylinder and of a metal material, is inserted through these long holes 24. The axial direction both end portions of the detent pin 26 project-out from the respective long holes 24 toward the radial direction outer side of the shift lever main body 14, and the detent pin 26 can move vertically along the axial direction of the shift lever main body 14.

Further, as shown in FIG. 3, the detent pin 26 passes through and is integrally connected to a detent rod 28 which is disposed at the inner side of the shift lever main body 14. The detent pin 26 is connected via the detent rod 28 to a detent releasing button 27 disposed at the shift knob 22. The detent pin 26 is urged upward by an unillustrated urging means. Due to the detent releasing button 27 being pushed and operated, the detent pin 26 is moved downward against the urging force of the unillustrated urging means, i.e., in the direction of approaching the retainer portion 18.

On the other hand, a pair of resin pieces 30 serving as a first molding resin are provided at positions corresponding to the long holes 24 respectively, at the outer side of the shift lever main body 14. The pair of resin pieces 30 are formed of a material which is softer than the resin outer tube 16, and have main body portions 32 which are formed in the shape of rectangular pillars. The end surface of each main body portion 32 at the shift lever main body 14 side is formed in the shape of a curved surface which fits closely to the outer periphery of the shift lever main body 14.

An interposed portion 34, whose outer periphery is formed in the shape of an ellipse in correspondence with the inner periphery of the long hole 24, extends out toward the shift lever main body 14 at the shift lever main body 14 side of each main body portion 32. These interposed portions 34 are disposed at the inner sides of the respective long holes 24.

A long hole 36, which passes through in the direction orthogonal to the axis of the shift lever main body 14, is formed in the central portion of each main body portion 34 and each interposed portion 34. The detent pin 26 passes through the respective long holes 36 so as to be able to move vertically. The axial direction both end portions of the detent pin 26 project-out from the pair of resin pieces 30 toward the radial direction outer side of the shift lever main body 14.

The interposed portions 34 of the pair of resin pieces 30 are interposed between the detent pin 26 and the inner peripheral walls of the respective long holes 24 of the shift lever main body 14. The distal ends of the interposed portions 34 are formed in the shapes of curved surfaces in correspondence with the inner periphery of the shift lever main body 14. The distal ends of the interposed portions 34 do not project further toward the inner side of the shift lever main body 14 than the inner peripheral walls of the shift lever main body 14.

A pair of extending portions 38, which extend along the peripheral direction of the shift lever main body 14, are formed at the shift lever main body 14 side end portion of the main body portion 32. The shift lever main body 14 side end surfaces of the pairs of extending portions 38 fit closely to the outer peripheral portion of the shift lever main body 14.

The resin pieces 30 having the above-described structure are assembled to the respective long holes 24 before the resin outer tube 16 is formed at the outer side of the shift lever main body 14, and are fixed to the shift lever main body 14 by the resin outer tube 16 in a state in which the end portions of the resin pieces 30 at the sides opposite the shift lever main body 14 are exposed. Further, the pair of extending portions 38 are disposed between the outer peripheral portion of the shift lever main body 14 and the resin outer tube 16, and the resin pieces 30 are prevented from falling out from the shift lever main body 14.

On the other hand, detent plates 40 are provided at the sides of the shift lever 12. Detent holes 42 are formed in the detent plates 40. The detent pin 26, which projects-out from the pair of resin pieces 30 of the shift lever 12, passes through the detent holes 42.

The inner peripheral wall of the top portion of the detent hole 42 is bent convexly and concavely in relation to the respective shift positions of "P", "R", "N", "D", "2", and "L". Movement of the detent pin 26 in the longitudinal direction of the vehicle is thereby limited. Namely, the shift operation positions are provided such that the operation of swinging the shift lever 12 in the longitudinal direction of the vehicle is not possible unless it is after the detent pin 26 has been moved downward by the pushing and operating of the detent releasing button 27. For example, at the "P" shift position, the detent pin 26 is within a deep groove of the detent hole 42, and shifting to the "R" shift position cannot be carried out if not accompanied by the aforementioned operation.

An arm and a rod, neither of which are illustrated, are connected to a connecting portion 44 which is formed at the resin outer tube 16 of the shift lever 12. The shift lever device 10 of the above-described structure is connected to the automatic transmission of the vehicle via the arm and the rod.

Operation of the first embodiment of the present invention will be described next.

In the shift lever device 10 of the above-described structure, due to the detent releasing button 27 of the shift knob 22 of the shift lever 12 being pushed and operated and the detent pin 26 moving downward relative to the shift lever main body 14, the operation of swinging the shift lever 12 in the longitudinal direction of the vehicle becomes possible.

Here, the interposed portions 34 of the resin pieces 30 are interposed between the detent pin 26 and the inner walls of the long holes 24 of the shift lever main body 14. Therefore, at the time when the detent pin 26 moves vertically relative to the shift lever main body 14, the detent pin 26 and the long holes 24 of the shift lever main body 14 are prevented from directly rubbing against one another, and the operational feeling can be made to be good.

Further, in the shift lever device 10, the resin pieces 30 which slidingly-contact the detent pin 26 are formed of a material which is softer than the resin outer tube 16 which is formed at the outer side of the shift lever main body 14. Namely, the resin pieces 30 can be molded by selecting a material which has good slidability, and the resin outer tube 16 can be molded by selecting a material which has high rigidity. In this way, both a good operational feeling and high rigidity of the shift lever 12 overall can be ensured.

Moreover, because the shift lever device 10 is a structure in which the resin pieces 30 and the resin outer tube 16, which is formed at the outer side of the shift lever main body 14, are molded separately, the resin pieces 30 can be molded independently with high precision. Accordingly, even in the structure in which the interposed portions 34 of the resin pieces 30 are interposed between the detent pin 26 and the inner walls of the long holes 24 of the shift lever main body 14, the interposed portions 34 do not project-out unnecessarily at the inner side of the shift lever main body 14. Accordingly, a precise inspection for checking whether or not the interposed portions 34 project-out at the inner side of the shift lever main body 14, and repair work for eliminating such projecting portions, are not needed, and the produceability improves.

SECOND EMBODIMENT

A second embodiment of the present invention will be described next. Note that structures and operations which are basically similar to those of the above-described first embodiment are denoted by the same reference numerals as in the first embodiment, and description thereof is omitted.

Figure 6:
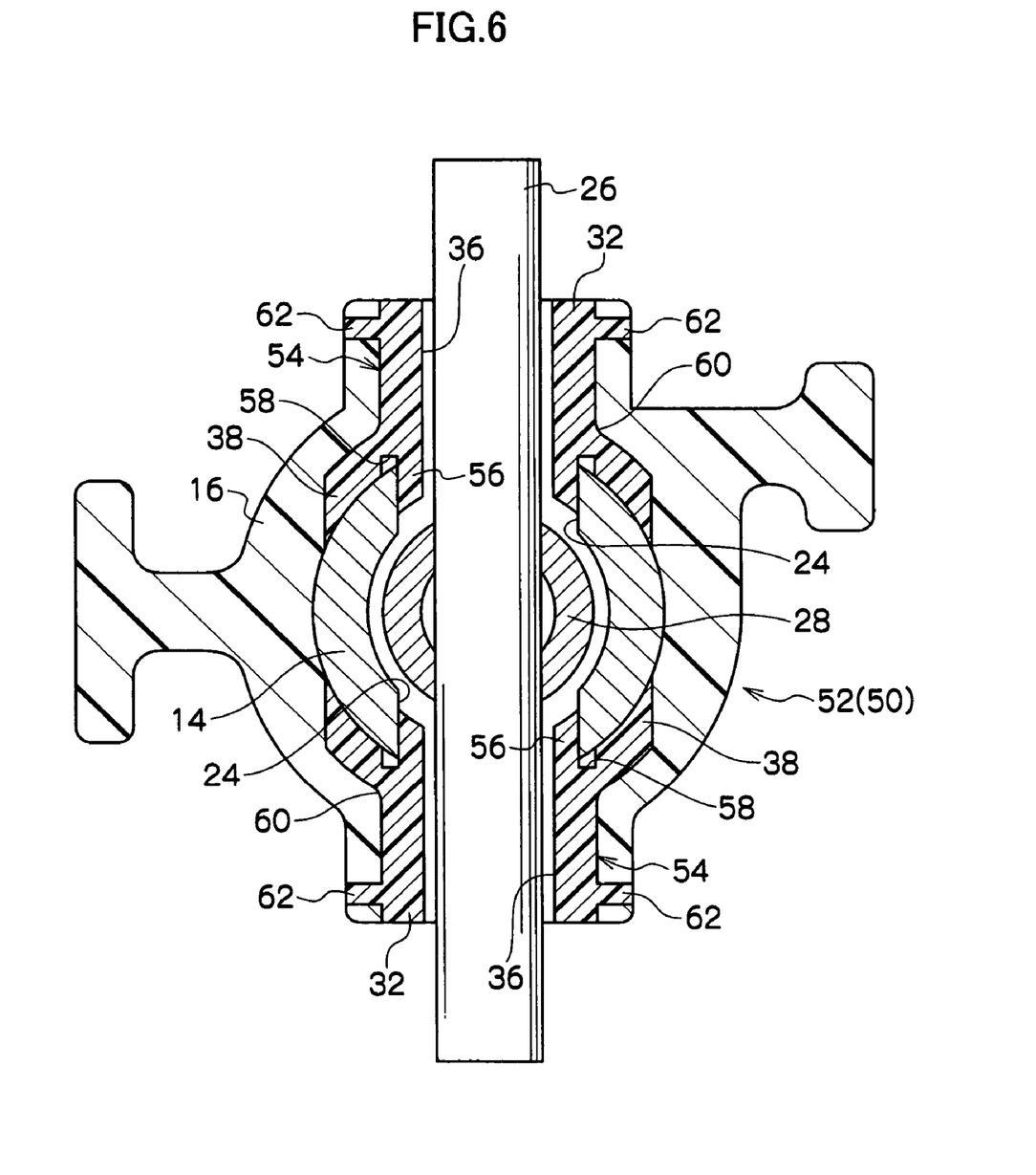
FIG. 6 is a cross-sectional view showing the structure of a shift lever of a shift lever device relating to a second embodiment of the present invention.

The structure of a shift lever 52, which is a structural member of a shift lever device 50 relating to a second embodiment of the present invention, is shown in a vertical sectional view in FIG. 6.

The shift lever device 50 has a structure basically similar to that of the shift lever device 10 relating to the above-described first embodiment. The shift lever 52 also has a structure basically similar to that of the shift lever 12 relating to the first embodiment. However, this shift lever 52 has a pair of resin pieces 54 (first molding resin) which are different than the pair of resin pieces 30 relating to the first embodiment.

The resin pieces 54 have a structure basically similar to that of the resin pieces 30 relating to the first embodiment. However, interposed portions 56, which are interposed between the detent pin 26 and the inner walls of the long holes 24 of the shift lever main body 14, are withdrawn from the inner peripheral wall of the shift lever main body 14 and are disposed toward the outer periphery of the shift lever main body 14.

Further, grooves 58 are formed between (at the connected portions of) the interposed portions 56 and the extending portions 38. The connected portions of the main body portions 32 and the extending portions 38 which contact the resin outer tube 16, are formed in the shapes of curved surfaces and are made to be rounded portions 60. Moreover, pairs of solid-cylindrical projections 62, which project-out in the directions of the short sides of the long holes 36, are formed at the outer walls of the main body portions 32. The resin outer tube 16 is formed at the peripheries of these projections 62.

Note that the other structural parts of the shift lever device 50 have similar structures as those of the shift lever device 10 relating to the above-described first embodiment.

Operation of the second embodiment of the present invention will be described next.

The shift lever device 50 of the above-described structure exhibits basically similar operation and effects as the shift lever device 10 relating to the above-described first embodiment.

Further, in the shift lever device 50, because the interposed portions 56 of the resin pieces 54 are withdrawn from the inner peripheral wall of the shift lever main body 14 and are disposed toward the outer periphery of the shift lever main body 14, even if slight burrs are formed at the interposed portions 56, the burrs can be prevented from projecting-out to the inner side of the shift lever main body 14.

Moreover, in the shift lever device 50, the grooves 58 are formed between the extending portions 38 and the interposed portions 56 of the resin pieces 54. Therefore, cracks can be prevented from forming between the interposed portions 56 and the extending portions 38 due to the pressure of the molding resin at the time of molding the resin outer tube 16 at the outer side of the shift lever main body 14.

In addition, in the shift lever device 50, the connected portions of the extending portions 38 and the main body portion 32 of the resin piece 54 are formed in the shapes of curved surfaces and are made to be the rounded portions 60. Therefore, at the time of molding the resin outer tube 16 at the outer side of the shift lever main body 14, the resin can flow-in well at the connected portions of the extending portions 38 and the main body portion 32.

Still further, in the shift lever device 50, the resin outer tube 16 is formed at the peripheries of the pairs of projections 62 which are formed at the outer walls of the main body portions 32. Therefore, the resin outer tube 16 and the main body portions 32 can be prevented from peeling after molding of resin outer tube 16.

Note that the shift lever device 50 relating to the second embodiment is structured such that the pair of projections 62 of the resin piece 54 are formed in the shapes of solid cylinders. However, the present invention is not limited to the same, and the pair of projections 62 may be formed in the shapes of keys or the shapes of lattices.

THIRD EMBODIMENT

A third embodiment of the present invention will be described next. Note that structures and operations which are basically similar to those of the above-described first and second embodiments are denoted by the same reference numerals as in the first and second embodiments, and description thereof is omitted.

Figure 7:
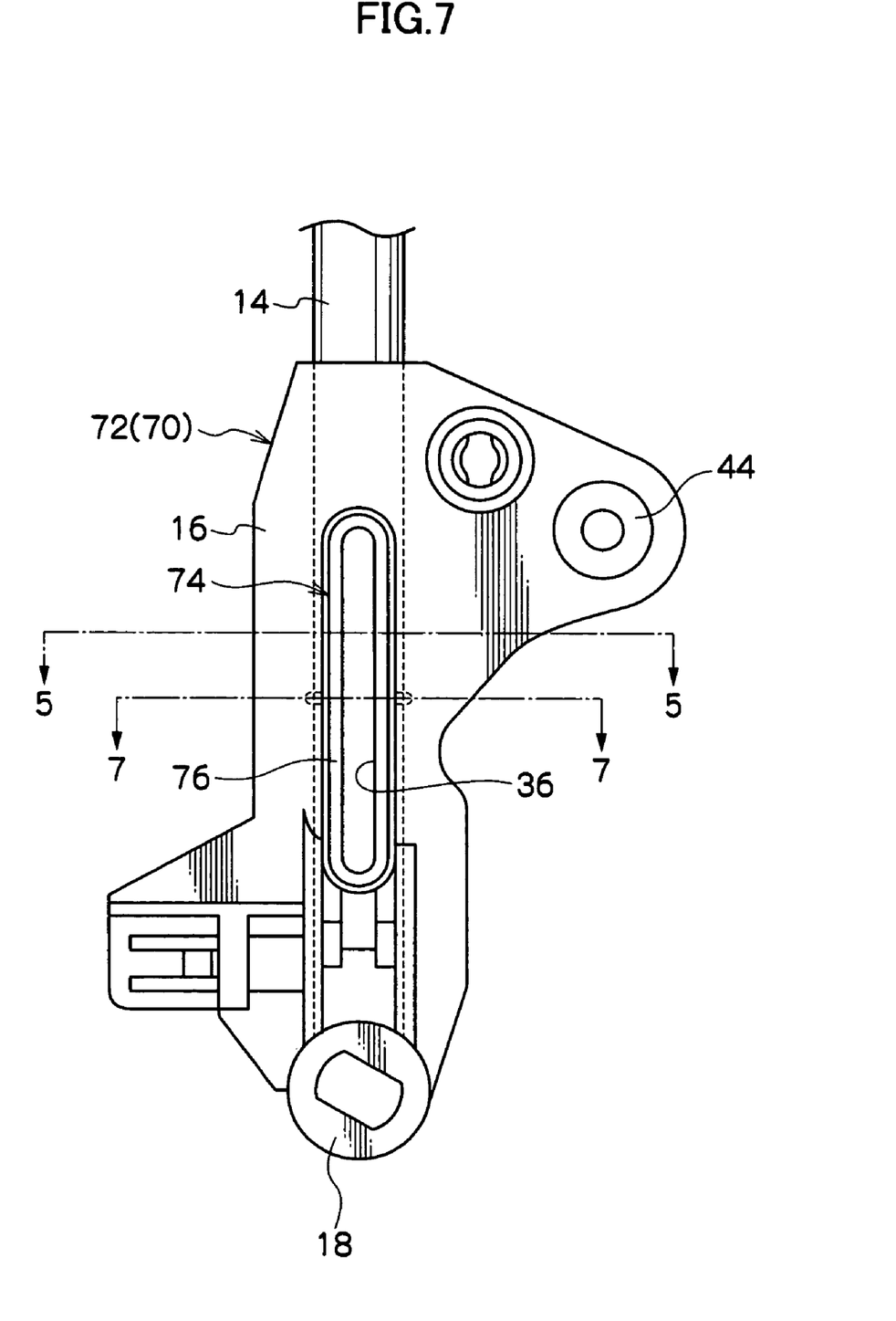
FIG. 7 is a side view showing the structure of a shift lever of a shift lever device relating to a third embodiment of the present invention.
Figure 8:
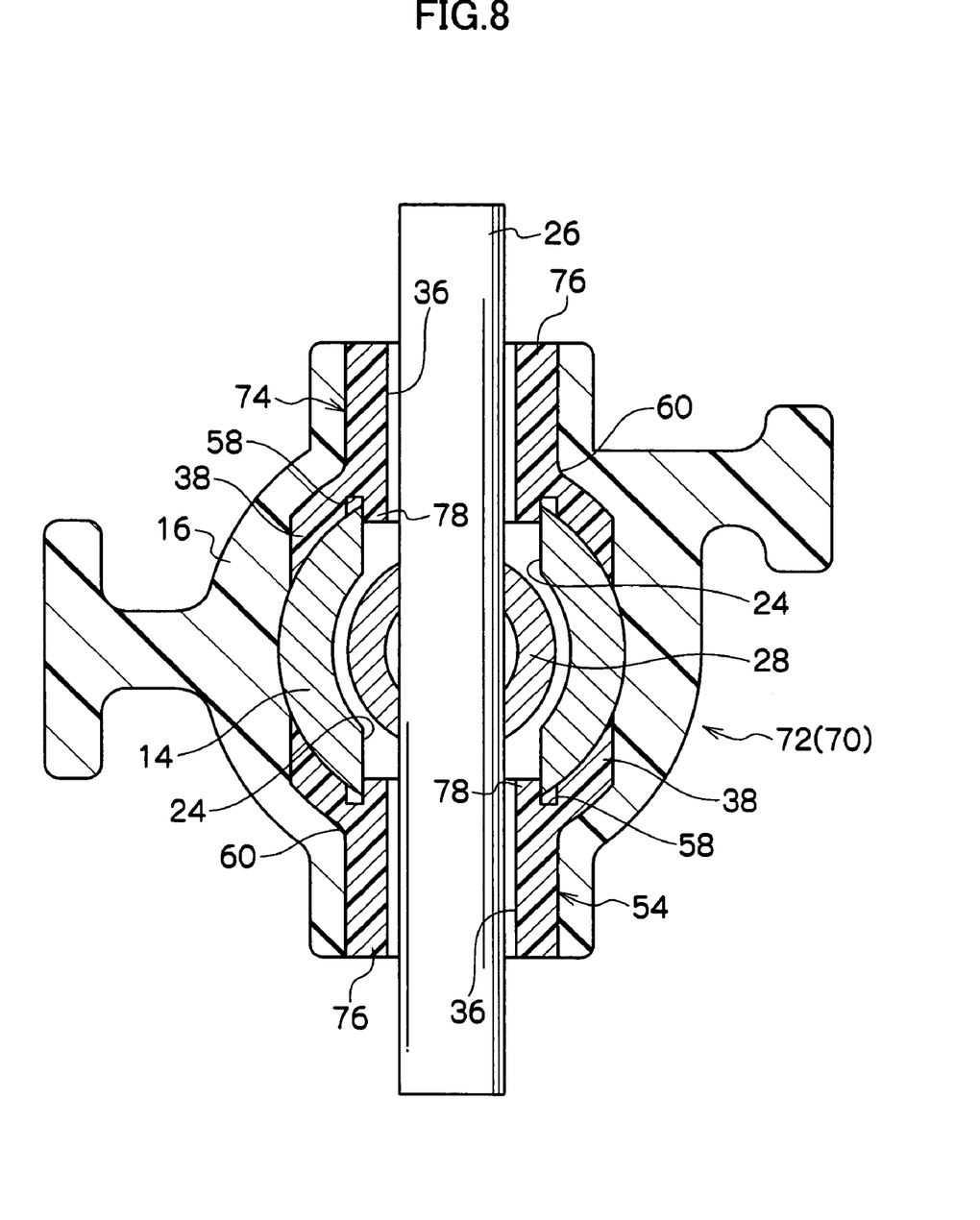
FIG. 8 is a cross-sectional view seen from line 5-5 of FIG. 7, and showing the structure of the third shift lever of the present invention.
Figure 9:
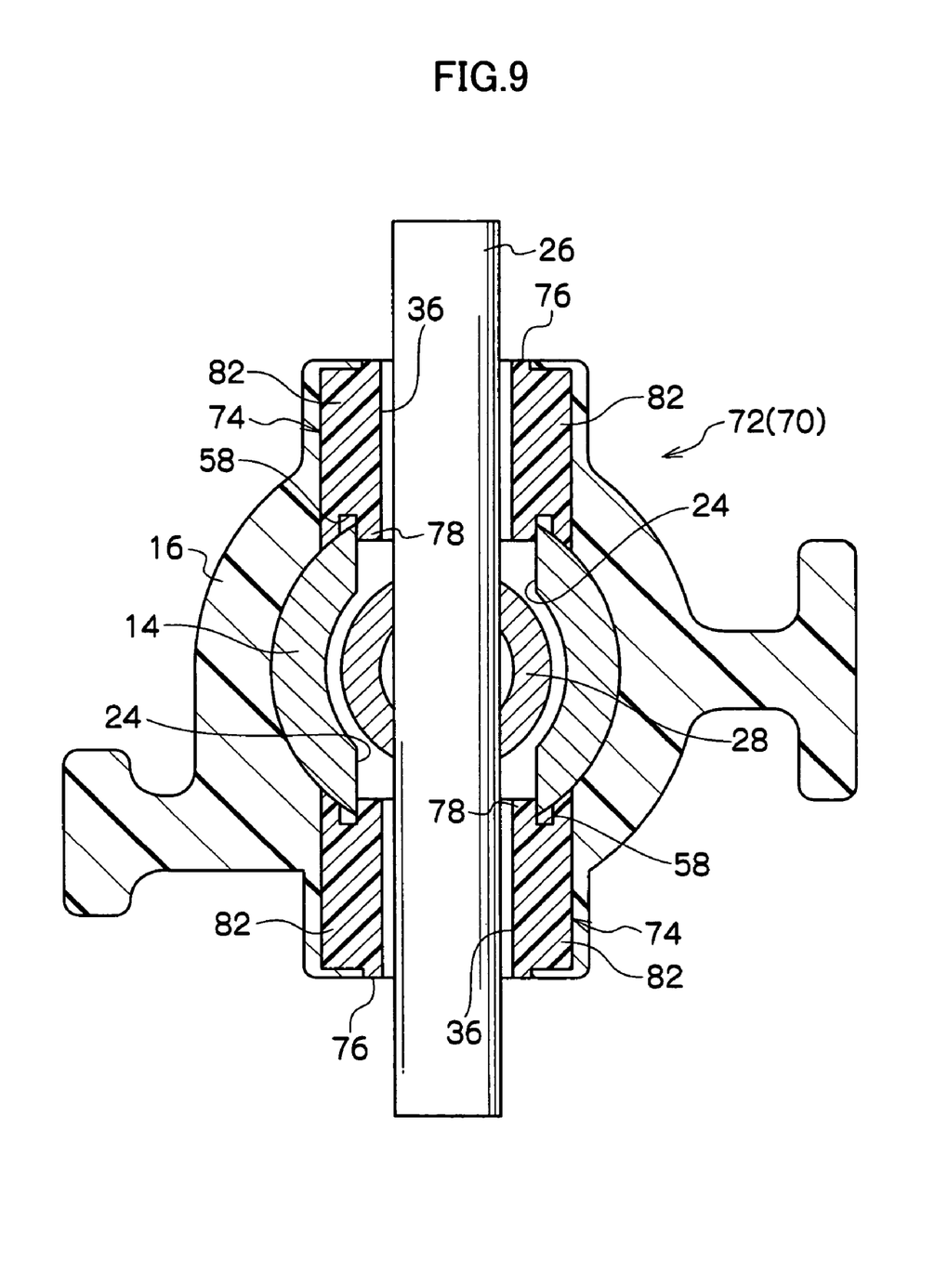
FIG. 9 is a cross-sectional view seen from line 7-7 of FIG. 7, and showing the structure of the third shift lever of the present invention.

The partial structure of a shift lever 72, which is a structural member of a shift lever device 70 relating to the third embodiment of the present invention, is shown in a side view in FIG. 7. Further, the structure of the shift lever 72 is shown in FIG. 8 in a cross-sectional view seen from line 5-5 of FIG. 7, and is shown in FIG. 9 in a cross-sectional view seen from line 7-7 of FIG. 7.

The shift lever device 70 has a structure basically similar to that of the shift lever device 10 relating to the above-described first embodiment. The shift lever 72 also has a structure basically similar to that of the shift lever 12 relating to the first embodiment. However, this shift lever 72 has a pair of resin pieces 74 (first molding resin) which are different than the pair of resin pieces 30 relating to the first embodiment.

Figure 10:
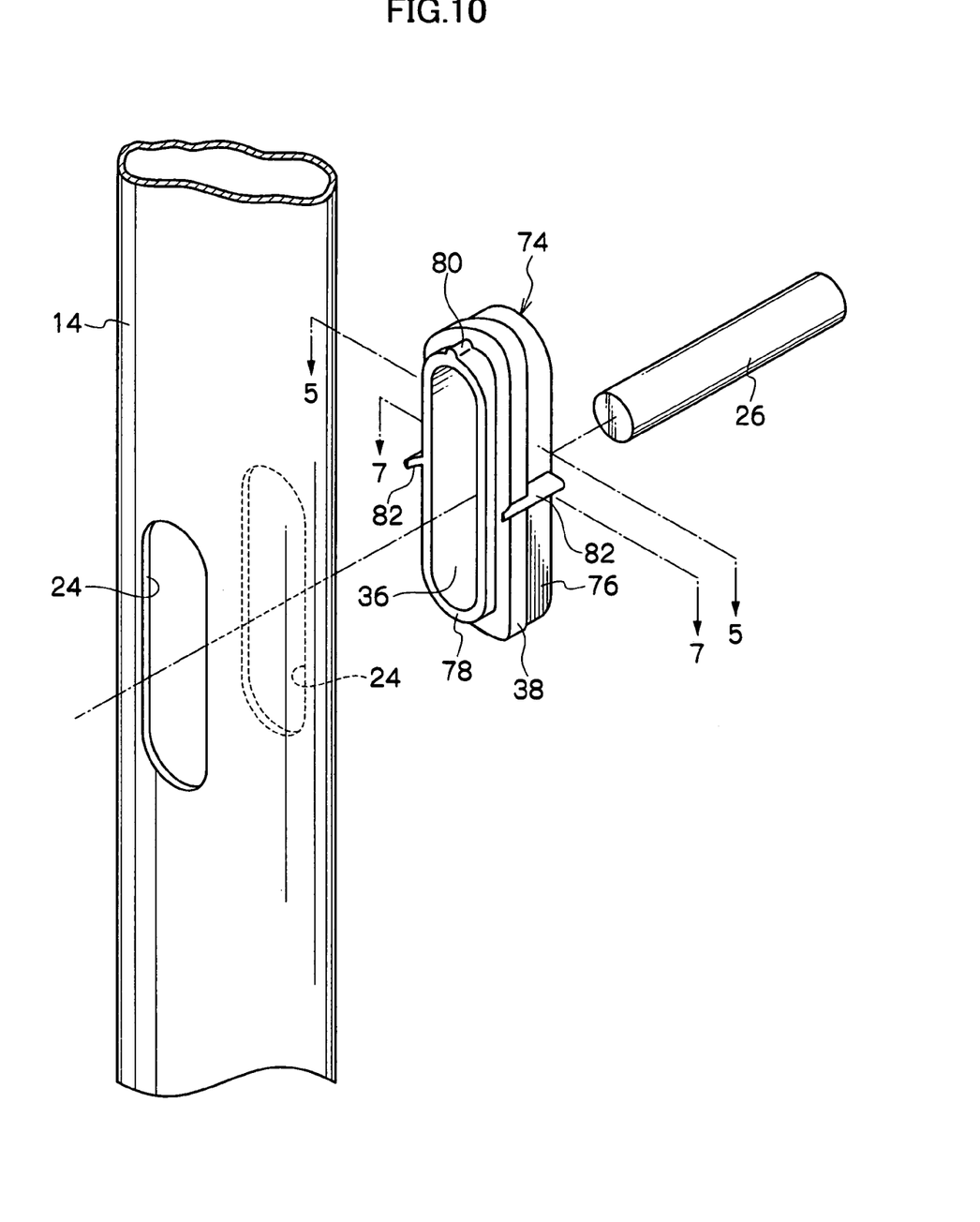
FIG. 10 is an exploded perspective view showing the structures of a shift lever main body, a first molding resin, and a detent pin which structure the shift lever of the shift lever device relating to the third embodiment of the present invention.
Figure 11:
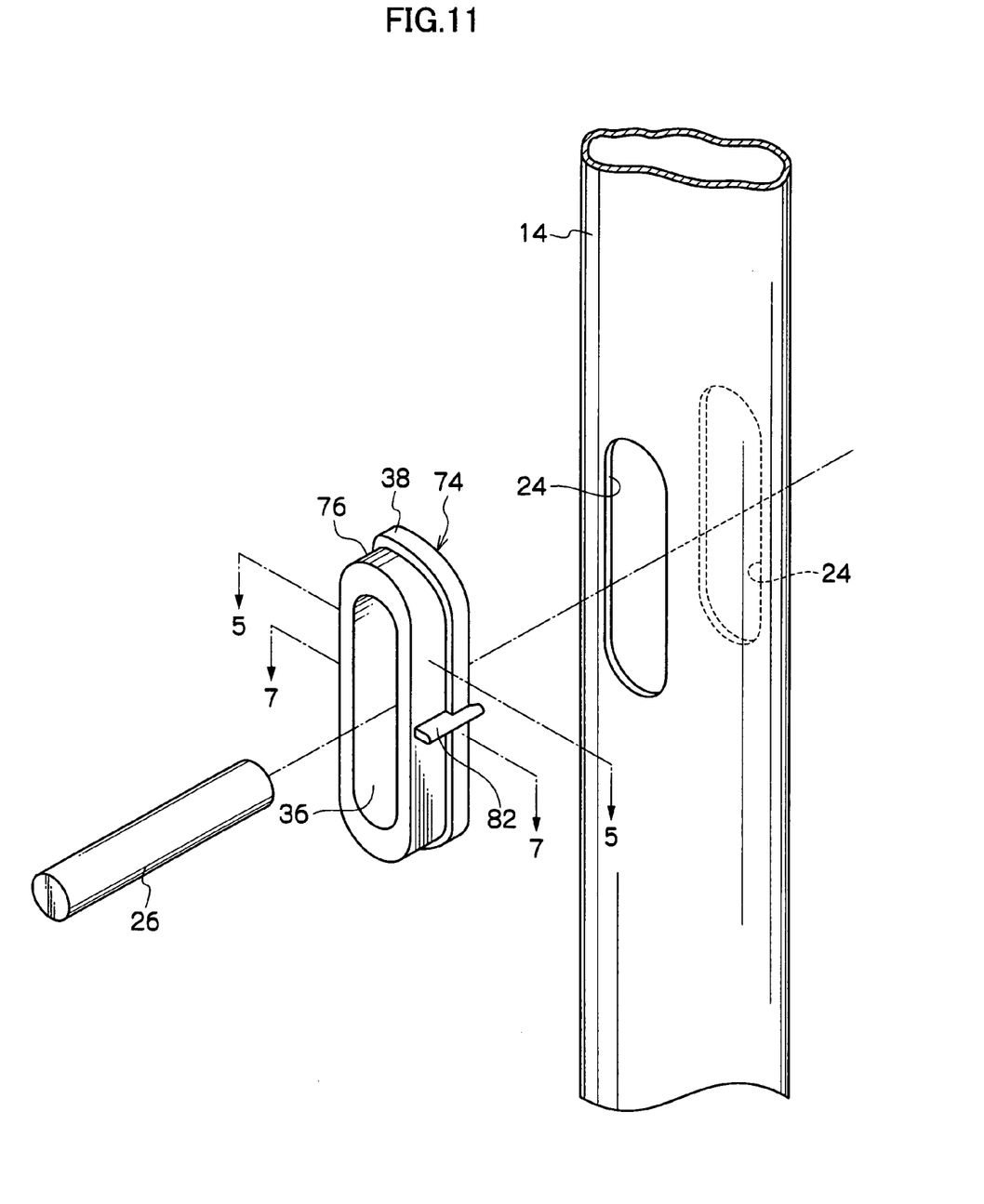
FIG. 11 is an exploded perspective view showing, in a state seen from a different angle than in FIG. 10, the structures of the shift lever main body, the first molding resin, and the detent pin which structure the shift lever of the third shift lever device of the present invention.

The resin piece 74 has a structure basically similar to that of the resin piece 54 relating to the second embodiment. However, as shown in FIGS. 10 and 11, the outer configuration of a main body portion 76, which is disposed at the outer side of the shift lever main body 14, is formed in the shape of an ellipse which corresponds to the long hole 36.

Further, an interposed portion 78, which is interposed between the detent pin 26 and the inner wall of the long hole 24 of the shift lever main body 14, is formed to be smaller than the interposed portion 56 relating to the second embodiment, and is greatly withdrawn from the inner peripheral wall of the shift lever main body 14 and disposed toward the outer periphery of the shift lever main body 14.

Moreover, a crush rib 80 which projects upward is formed at the outer periphery of the top end portion of the interposed portion 78. The resin piece 74 is held at the shift lever main body 14 due to the crush rib 80 interfering with the inner periphery of the long hole 24 at the time when the resin piece 74 is assembled to the shift lever main body 14 before the molding of the resin outer tube 16.

Still further, as shown in FIG. 9 as well, a pair of fall-out preventing projections 82, which project-out in the direction of the short side of the long hole 36 from the outer peripheries of the main body portion 76 and the extending portion 38, are formed at the longitudinal direction intermediate portion of the resin piece 74 instead of the pair of projections 62 of the resin piece 54 relating to the above-described second embodiment. The pair of fall-out preventing projections 82 are formed so as to be withdrawn, by a predetermined dimension, from the end surface of the main body portion 76 which end surface is at the side opposite the shift lever main body 14. The resin outer tube 16 is formed at the peripheries of the pair of fall-out preventing projections 82.

Note that the other structural parts of the shift lever device 70 have similar structures as those of the shift lever device 10 relating to the above-described first embodiment.

The shift lever device 70 of the above-described structure exhibits basically similar operation and effects as the shift lever device 50 relating to the above-described second embodiment.

What is claimed is:

1. A shift lever device comprising:
a shift lever main body which is formed in a shape of a tube, and in whose axial direction intermediate portion there is formed a long hole which passes through in a direction orthogonal to an axis;
a detent pin inserted through the long hole;
a resin piece formed from a first molding resin and having a portion which is interposed between the detent pin and an inner wall of the long hole at an inner side of the long hole of the shift lever main body; and
an outer tube formed from a second molding resin and surrounding an outer side of the shift lever main body in order to fix the interposing portion of the resin piece between the detent pin and the inner wall of the long hole of the shift lever main body
wherein said resin piece and said outer tube are mechanically discrete and separate components, and wherein the interposed portion of the resin piece is recessed away from an inner peripheral wall of the shift lever main body and disposed toward an outer periphery of the shift lever main body.

2. The shift lever device of claim 1, wherein the first molding resin is formed of a material which is softer than the second molding resin.

3. The shift lever device of claim 1, wherein the resin piece has an extending portion which extends along a peripheral direction of the shift lever main body and is disposed between the outer tube and an outer peripheral portion of the shift lever main body, and wherein a groove is formed in the resin piece between the interposed portion and the extending portion.

4. A shift lever device comprising:
a shift lever main body which is formed in a shape of a tube, and in whose axial direction intermediate portion there is formed a long hole which passes through in a direction orthogonal to an axis;
a detent pin inserted through the long hole;
a resin piece formed from a first molding resin having a portion which is interposed between the detent pin and an inner wall of the long hole at an inner side of the long hole of the shift lever main body; and
an outer element formed from a second molding resin and disposed on an outer side of the shift lever main body in order to fix the shift lever main body and the resin piece formed from the first molding resin,
wherein opposing end surfaces of the resin piece are disposed at a position which is recessed away from an inner peripheral wall of the shift lever main body and a position recessed away from an outer peripheral wall of the shift lever main body, respectively.

5. The shift lever device of claim 4, wherein the first molding resin is formed of a material which is softer than the second molding resin.

6. The shift lever device of claim 4, wherein the resin piece has an extending portion which extends along a peripheral direction of the shift lever main body and is disposed between the outer element and an outer peripheral portion of the shift lever main body, and a groove is formed in the resin piece between the interposed portion and the extending portion.

7. The shift lever device of claim 4, wherein the resin piece and the outer element are molded separately.

* * * * *